US00RE34031E

United States Patent [19]

Thomsen et al.

[11] E Patent Number: Re. 34,031

[45] Reissued Date of Patent: Aug. 18, 1992

[54] FILTERING SYSTEM

[75] Inventors: Jack W. Thomsen, LaGrange Park; John W. Tadlock, West Chicago, both of Ill.

[73] Assignee: Everpure, Inc., Westmont, Ill.

[21] Appl. No.: 532,224

[22] Filed: Mar. 22, 1989

Related U.S. Patent Documents

Reissue of:

[64] Patent No.: 4,654,142
Issued: Mar. 31, 1987
Appl. No.: 798,948
Filed: Nov. 18, 1985

U.S. Applications:

[63] Continuation of Ser. No. 327,305, Mar. 22, 1989, abandoned.

[51] Int. Cl.[5] ..... B01D 27/02; B01D 27/08

[52] U.S. Cl. ..... 210/232; 210/249; 210/282; 210/440; 210/444

[58] Field of Search ..... 210/232, 234, 235, 238, 210/249, 250, 282, 440, 443, 444, 450, 472

[56] References Cited

U.S. PATENT DOCUMENTS

| | | | |
|---|---|---|---|
| 1,208,882 | 12/1916 | Young | 210/249 |
| 1,464,822 | 8/1923 | Justus | 210/249 |
| 1,873,795 | 8/1932 | Sweetland | 210/444 |
| 2,544,244 | 3/1951 | Vokes | 210/234 |
| 2,597,217 | 5/1952 | Zenick | 210/249 |
| 2,647,871 | 8/1953 | Frazier | 210/282 |
| 2,867,328 | 1/1959 | Sorensen | 210/443 |
| 3,080,977 | 3/1963 | Jones | 210/444 |
| 3,105,042 | 9/1963 | Roosa | 210/234 |
| 3,319,791 | 5/1967 | Horne | 210/234 |
| 3,458,441 | 7/1969 | Dockery | 210/444 |
| 3,502,221 | 3/1970 | Butterfield | 210/444 |
| 3,746,171 | 7/1973 | Thomsen | 210/444 |
| 3,785,164 | 1/1974 | Wrenn | 210/282 |
| 3,819,055 | 6/1974 | Skinner | 210/232 |
| 3,842,870 | 10/1974 | Burgess | 210/444 |
| 3,907,688 | 9/1975 | Close | 210/444 |
| 3,935,106 | 1/1976 | Lipner | 210/232 |
| 3,954,624 | 5/1976 | Petrucci | 210/444 |
| 3,982,520 | 9/1976 | Wheeler | 210/444 |
| 4,133,763 | 1/1979 | Cooper | 210/232 |
| 4,267,042 | 5/1981 | Hofmann | 210/444 |
| 4,515,692 | 5/1985 | Chandler et al. | 210/278 |
| 4,559,136 | 12/1985 | Dockery | 210/235 |
| 4,591,438 | 5/1986 | Tanabe | 210/282 |

FOREIGN PATENT DOCUMENTS

| | | | |
|---|---|---|---|
| 1047171 | 12/1958 | Fed. Rep. of Germany | 210/232 |
| 1943946 | 3/1976 | Fed. Rep. of Germany | 210/232 |
| 965328 | 7/1964 | United Kingdom | 210/232 |
| 1028100 | 5/1966 | United Kingdom | 210/232 |

OTHER PUBLICATIONS

AP500 Gold Published by AMF as Form B-18 pp. 1-4, Mar. 1979.

*Primary Examiner*—Ernest G. Therkorn
*Attorney, Agent, or Firm*—Frank R. Thienpont

[57] ABSTRACT

A filtering system for water treatment including a head member having fluid inlet and outlet ports, a bracket member adapted to be secured to stationary support means, the head member being secured to the bracket member, a disposable filter cartridge closed at one end and being equipped at its other end with a closure member, the closure member having inlet and outlet passages formed therein to communicate with the interior of said filter cartridge, the closure member portion of the filter cartridge being insertable into the head member, its inlet and outlet passages formed so as to communicate with the inlet and outlet ports in the head member, and coacting locking means formed on the head member and the bracket member to secure the filter cartridge in place during operation of the filter system and also permit easy insertion of the closure member into and withdrawal of the closure member from the head member.

43 Claims, 3 Drawing Sheets

FILTERING SYSTEM

Matter enclosed in heavy brackets [ ] appears in the original patent but forms no part of this reissue specification; matter printed in italics indicates the additions made by reissue.

*This is a continuation of copending application Ser. No. 07/327,305 filed on Mar. 22, 1989, now abandoned, which, in turn, is a reissue of U.S. Ser. No. 798,948, filed Nov. 18, 1985, now U.S. Pat. No. 4,654,142.*

BACKGROUND OF THE INVENTION

This invention relates to a filtering system and more particularly to a system in which a disposable filter cartridge can be quickly inserted into and removed from a head member which is permanently mounted in a fluid conduit.

SUMMARY OF THE INVENTION

An object of the invention is to provide in a water treatment system a convenient economical filter assembly wherein a disposable filter cartridge can easily be installed in the line by hand without the user of cumbersome extra tools.

Another object is to provide a low cost filter assembly in which the filter cartridge is easily locked and held in place under line pressure conditions.

DESCRIPTION OF THE PREFERRED EMBODIMENT

Figure 1:
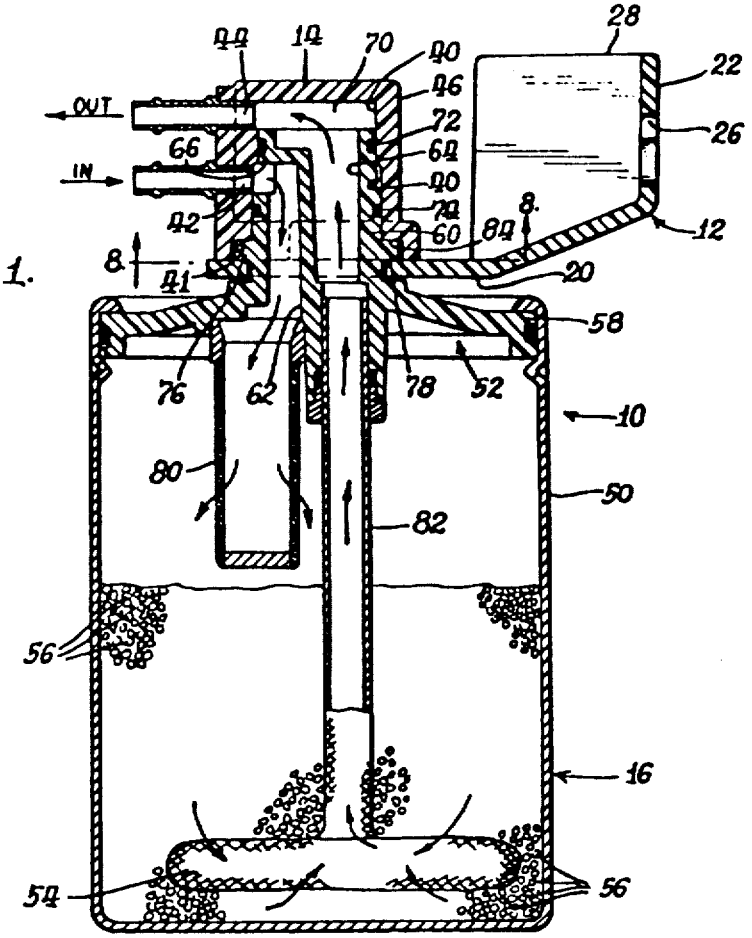
FIG. 1 is a sectional view in elevation taken along line 1—1 of FIG. 2 of the filter assembly embodying the invention herein in an assembled position.
Figure 2:
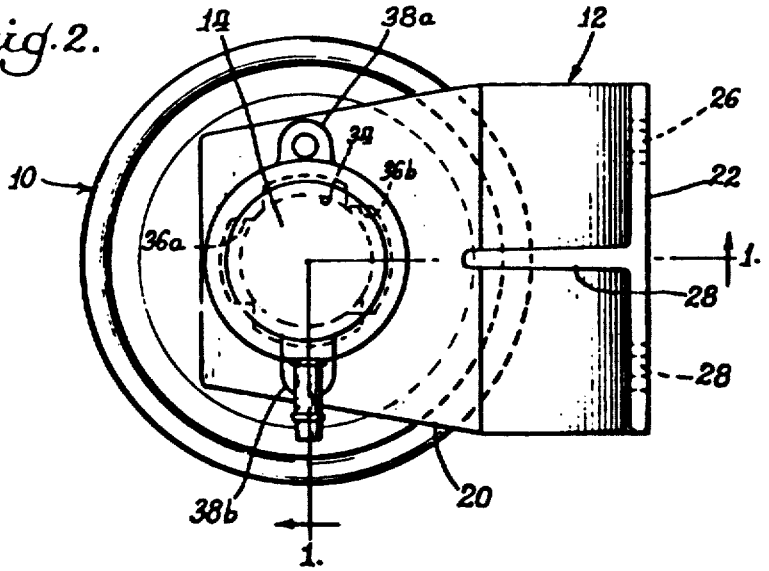
FIG. 2 is a plan view of the bracket member and head member in which the filter cartridge is mounted.

Referring now to the drawings wherein like reference characters refer to like parts the filter assembly 10 includes a bracket member 12 for supporting a head member and a filter cartridge, a head member 14 secured to the bracket member and a filter cartridge 16 which is inserted into and supported in the head member.

Figure 4:
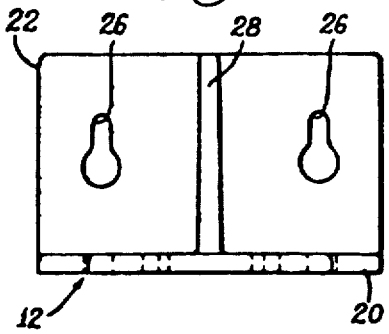
FIG. 4 is a front view of the bracket member of FIG. 3.
Figure 3:
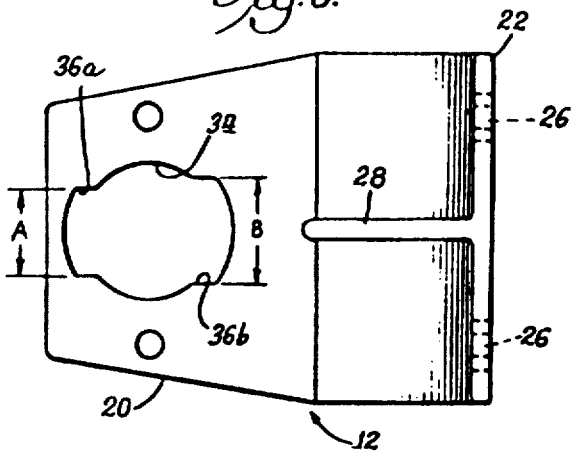
FIG. 3 is a plan view of the bracket member used for supporting the filter cartridge and head member.
Figure 6:
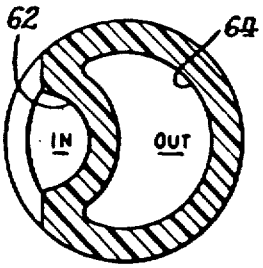
FIG. 6 is a top sectional view taken at line 6—6 of FIG. 5 showing the shape of inlet and outlet passages at designated points in the closure member.

The bracket member 12 includes a generally laterally extending plate-like portion 20 with a substantially vertically extending integral portion 22. A pair of openings 26 are formed in vertical portion 22 for mounting on a supporting structure. A reinforcing plate 28 as seen in FIGS. 1, 3 and 4 adds strength to the bracket member. The bracket member 12 may be mounted against the inside wall of a tank or other supporting structure.

A circular opening 34 is formed in the laterally extending portion 20 for receiving therethrough the upper end of the filter cartridge. A pair of oppositely disposed bayonet openings 36a and 36b are connected to the opening 34. The width A of opening 36 a is narrower than width B of opening 36b for reasons to be subsequently explained.

The head member 14 preferably of a molded plastic is an inverted cylindrical cup-like structure formed with two oppositely disposed flanges 38a and 38b by which it is secured to the bracket member. A bore 40 is formed in the head member 14 for receiving the upper end of a filter cartridge therein. A pair of ports 42 and 44, one and inlet and the other an outlet, and formed in the cylindrical wall 46 of the head member. In the embodiment shown in FIG. 1 42 is the inlet port and 44 is the outlet port although these may be reversed depending on the type of filter arrangement within the pressure vessel as will be subsequently described in connection with the embodiment of FIG. 9. Appropriate connections made to these ports 42 and 44 is what incorporates the filter assembly into a fluid conduit which provides the water to the unit or device which ultimately uses the filtered or treated water.

The bore 40 is enlarged at its lower end in the form of a counterbore 41. A pair of circumferentially spaced stops 48a and 48b are formed at the lower enlarged end of bore 40 to limit the rotation of the filter cartridge 16 in the head member 14 as hereinafter more fully explained.

The filter cartridge 16 of FIG. 1 includes a pressure vessel 50, a closure member 52 a filter septum 54 and a filter media 56. The filter cartridge is designed to be a disposable unit which may be easily inserted into the head member 14 and removed therefrom by hand all without the use of special tools.

The pressure vessel 50 which may be of metal or plastic is closed at its lower end as shown in FIG. 1, and the closure member 52 is sealingly fitted into the open end of the pressure vessel by appropriate means.

The closure member 52 which preferably is made of a plastic material includes an annular base portion 58, which is the portion fitted into the open end of the pressure vessel, and an elongated generally cylindrical portion 60 formed integrally with the base portion. The cylindrical portion 60 is inserted into the head member 14 in the filter assembly.

Figure 5:
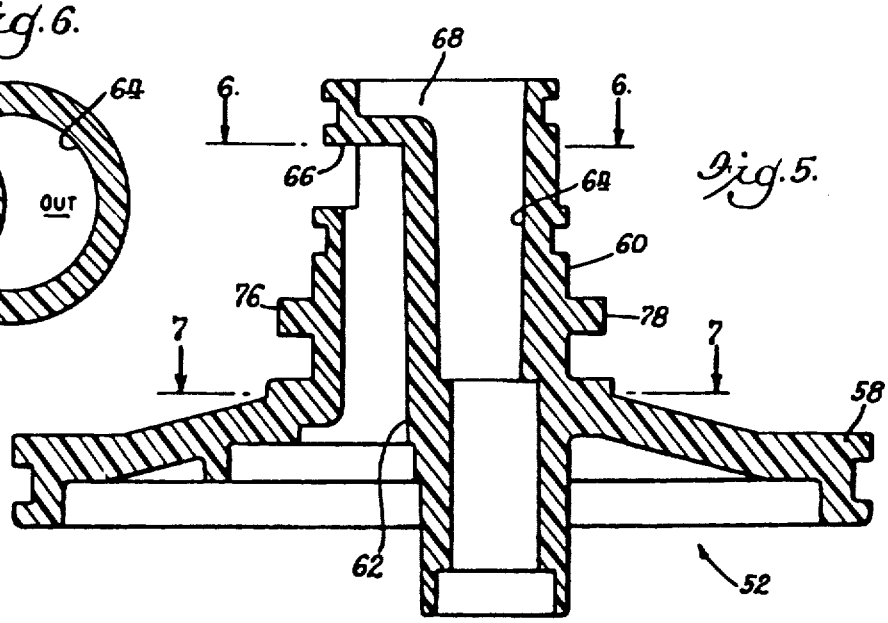
FIG. 5 is a sectional view in elevation of the closure member fitted in the upper open end of the pressure vessel.
Figure 8:
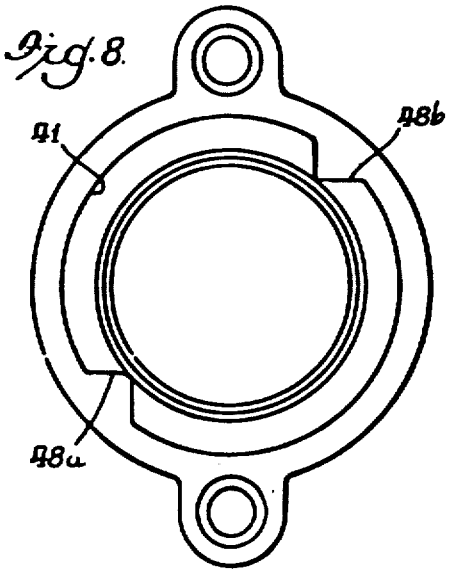
FIG. 8 is a bottom plan view of the head member taken along line 8—8 of FIG. 1.
Figure 7:
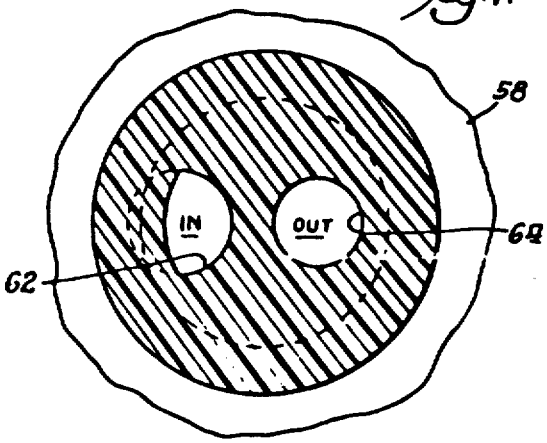
FIG. 7 is a top sectional view taken at line 7—7 of FIG. 5 showing the shape of inlet and outlet passages at other designated points in the closure member.

A pair of substantially axially extending fluid inlet and outlet passages 62 and 64 are formed in the elongated cylindrical portion 60 of the closure member and as shown in FIGS. 1 and 5, 62 is the inlet passage and 64 is the outlet passage. The passages 62 and 64 are both disposed slightly off center from the axis of the closure member. A fluid port 66 is formed in the sidewall of the cylindrical portion 60 in communication with passage 62. A fluid port 68 is formed in the upper end of cylindrical portion 60 in communication with passage 64. In the assembly of FIG. 1 fluid port 66 communicates with inlet port 42 formed in head member 14, and fluid port 68 communicates with outlet port 44 formed in head member 14. As will be noted from FIG. 1 when the closure member of the filter cartridge is in place in the head member, the closure member does not extend to the very top of the head member thus leaving a well 70 at the upper end of the head member which communicates with the fluid port 68, outlet passage 64 and outlet port 44.

O-ring seals 72 and 74 are disposed on the outer surface of the closure member. It will be observed that O-ring seal 72 is disposed at the upper end of the closure member so that in the assembly, inlet fluid entering the filter assembly by way of inlet port 42 will be sealed off from outlet fluid exiting through port 44. O-ring seal 74 is positioned at a point on the closure member to prevent leakage of inlet fluid to the outside.

A pair of oppositely extending bayonet lugs 76 and 78 are formed on the exterior of cylindrical portion 60 of the closure member 52. When the filter cartridge is inserted into the head member, the cylindrical portion 60 of the closure member with its attached bayonet lugs must first pass through opening 34 and bayonet openings 36a and 36b in the bracket member 12. As previously mentioned the bayonet openings 36a and 36b are of different sizes, one being narrower than the other. Likewise the bayonet lugs are of correspondingly different sizes one being narrower than the other so that the filter cartridge can be inserted into the head member in only one position. A counterbore 41 of predetermined depth in the lower end of the head member 14—substantially the same depth as the thickness of the bayonet lugs—limits the depth to which the filter cartridge can be inserted into the head member.

After insertion into the head member the filter cartridge is then rotated a quarter turn until the one side of each of the bayonet lugs 76 and 78 come to rest against stops 48a and 48b. Rotation of the filter cartridge to this position aligns the fluid inlet port 66 in the side wall of cylindrical portion of the closure member with inlet port 42 in the head member. The filter cartridge now also is clamped in position ready to withstand fluid pressure in the fluid system which might tend to disengage the filter cartridge from the head member, because the bayonet lugs 76 and 78 are secured between the bracket member and the bottom of counterbore 41. Thus the bayonet lugs are effective through coaction with the stop means to align the fluid port means and are further effective through coaction with the bracket member to secure the filter cartridge against being blown out of the head member.

A tubular screen strainer 80 is associated with the fluid inlet passage 62, the upper end of the strainer 80 being attached to the closure member by some appropriate well-known means.

One type of filter means that may be used in the filter cartridge includes the filter septum 54 as shown in FIG. 1. It may be made, for example, of a woven material. It is disposed near the bottom of the pressure vessel and attached to the outlet passage 64 by a tube 82 which in turn is attached to the closure member and forms part of the outlet passage 64. The filter means also may include a filter media 56 which may fill up as much as ⅔ or more of the pressure vessel. The filter media preferably is a granular activated carbon. Therefore, when influent enters the inlet 42 and proceeds through inlet passage 62 it moves through the filter media 56, then through the collector or filter septum 54, into tube 82 and out through the outlet passage 64 and outlet port 44.

The insertion and removal of the disposable filter cartridge from the system is a simple task. Since influent, usually water, is supplied to the system under pressure, a shut-off valve (not shown) usually will be provided in the inlet line somewhere upstream from inlet port 42. This valve is shut off during installation or replacement of a filter cartridge into the system. With the shut-off valve closed the filter cartridge is inserted into the head member by lining up the bayonet lugs 76 and 78 with the appropriate size bayonet openings 36a and 36b. Once properly lined up the filter cartridge is inserted into the head member until the bayonet lugs contact the shoulder 84 and then turned a quarter turn until the bayonet lugs contact the tops 48a and 48b. Opening the shut-off valve again places the system in operation.

Figure 10:
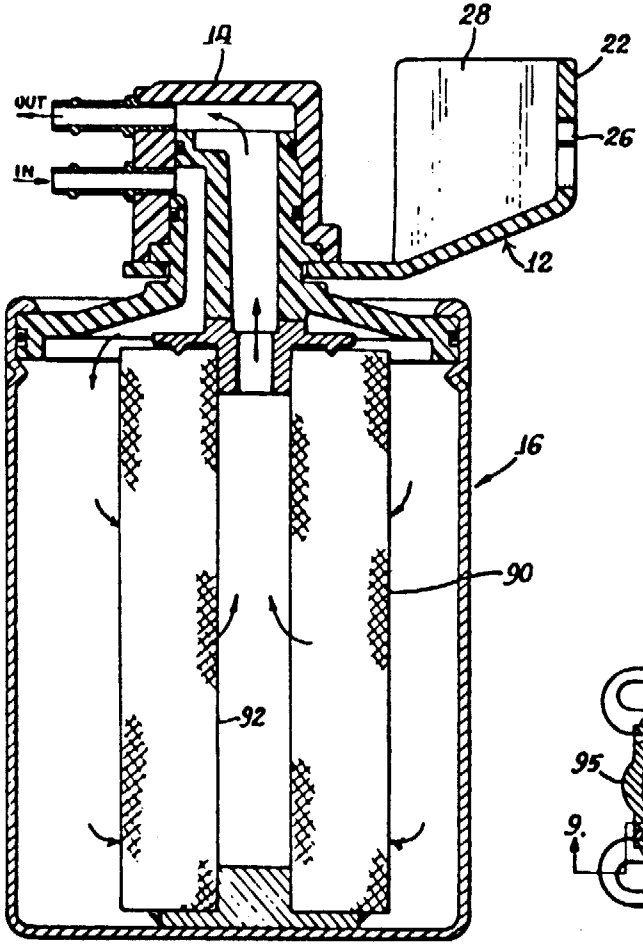
FIG. 10 is a sectional view in elevation of still another embodiment of a filter assembly embodying the invention.
Figure 9:
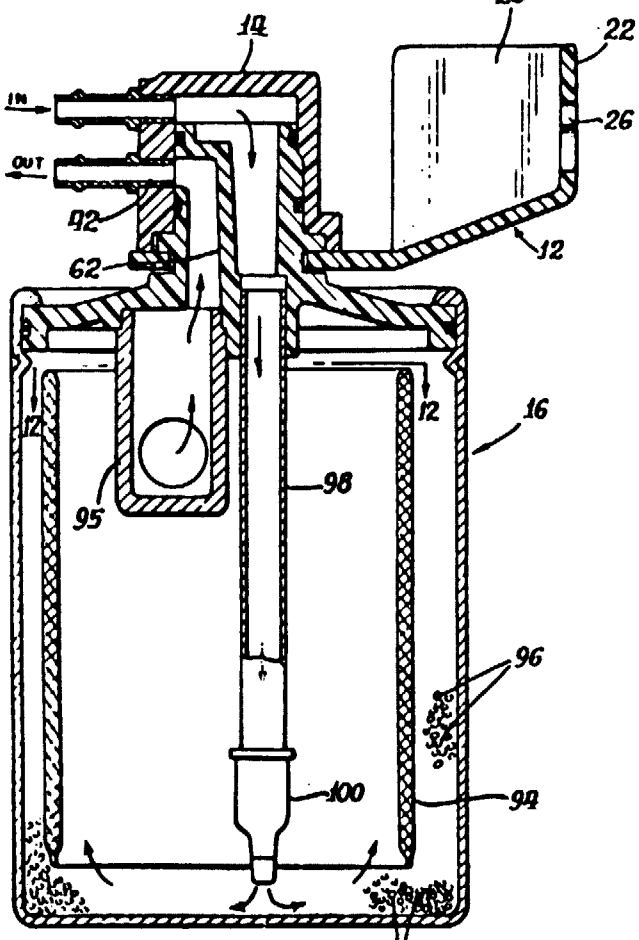
FIG. 9 is a sectional view in elevation of another embodiment of a filter assembly embodying the invention.

Two additional embodiments are shown in FIGS. 9 and 10. The embodiments of FIGS. 9 and 10 differ from that of FIG. 1 principally in the use of a different type of filter within the pressure vessel. In the embodiment of FIG. 10, for example, a cylindrical filter unit 90 is used. It is formed with a central passage 92 closed at its lower end which is aligned with outlet passage 64 in the closure member. The unit 90 may be a string wound filter unit or a spun bonded unit. A spirally wound cartridge also may be used. In each case the influent water enters through inlet port 42, fills the pressure vessel and passes radially inwardly through the filter unit 90 to the center thereof into central passage 92 and out through outlet passage 64 and outlet port 44.

In the embodiment of FIG. 9 the use of a folded or pleated filter septum 94 is illustrated. Powdered filter media 96 also at least partially fills the pressure vessel 50. The filter media could be finely powdered carbon and/or other well known powdered filter media, such, for example, as diatomaceous earth or powdered silver cellulose. The septum 94 is connected to and supported on a septum support tube 95 which is connected to passage 62. The tube 95 thus functions both as a septum support tube and as an outlet tube from the septum 94 to carry filtered liquid from the septum 94 through inlet 97 in support tube 95 and then to passage 62. In this embodiment the inlet and outlet ports and passages are reversed—port 44 becomes the inlet port and port 42 becomes the outlet port. An inlet tube 98 is connected to passage 64 of the closure member and extends down through the filter septum 94 to the bottom of the pressure vessel.

A check valve 100, which may be of the flapper type, is connected to the lower end of tube 98. Inlet fluid, therefore, passes downwardly through tube 98, check valve 100 and the powdered filter media 96, through the filter septum 94, through tube 95 and out through passage 62 and outlet port 42.

Figure 11:
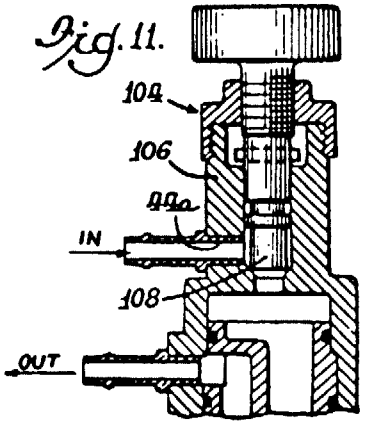
FIG. 11 is a sectional view in elevation of a shut-off valve which may be associated with the inlet to the filter assembly.
Figure 12:
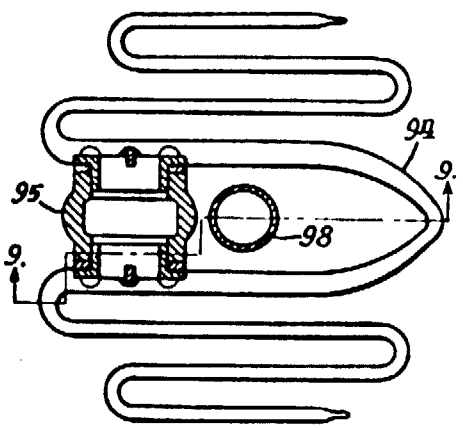
FIG. 12 is a plan view taken along line 12—12 of FIG. 9.

In this particular embodiment of FIG. 9 a shutoff valve 104 as shown, for example, in FIG. 11 may be mounted in the upper end of head member 14 to control the inlet of fluid into the filter cartridge through the inlet port. As shown in FIG. 11 the head member 14 can be slightly modified by adding thereto an elongated boss 106 into which an elongated stem 108 of the shut-off valve extends. The lower end of the stem 108 controls the inlet of fluid through port 44a. When the filter cartridge is to be replaced the shut-off valve 104 is closed so that the cartridge can be removed and replaced without being subject to fluid pressure at the inlet.

While a preferred embodiment of the invention has been disclosed, it will be appreciated that this is shown by way of example only, and the invention is not to be limited thereto as other variations will be apparent to those skilled in the art and the invention is to be given its fullest interpretation within the terms of the following claims.

What is claimed is:

1. A filter assembly comprising:

(a) a plate-like bracket member adapted to be supported on a supporting wall structure, said bracket member including annular opening means for receiving a closure member of a filter cartridge therethrough, said opening means including a pair of oppositely disposed bayonet openings, (b) a head member attached to said bracket member for receiving a filter cartridge therein, said head member comprising an inverted cup-like structure having inlet and outlet ports in the wall thereof and adapted to have a filter cartridge secured therein, (c) a filter cartridge including (1) a pressure vessel closed at one end, (2) a closure member sealingly disposed in the open end of said pressure vessel, said closure member including, (a) an annular base portion which is fitted into and secured into the open end of said pressure vessel, (b) an elongated cylindrical portion formed integrally with said base portion and adapted to be inserted into said head member in sealing engagement therewith, (c) a pair of axially extending inlet and outlet passages formed in said elongated cylindrical portion, (1) one of said passages being formed with a first communicating port in the wall of said cylindrical portion, (2) the other of said passages being formed with a second communicating port in the wall of said cylindrical portion, (3) said first and second communicating ports being in fluid communication with the inlet and outlet ports of said head member, (d) a pair of radially extending bayonet locking lugs formed on the outer surface of said closure member and adapted to be aligned with said bayonet openings in said bracket member when the filter cartridge is inserted into or removed from the head member, (3) filter means disposed within said pressure vessel between the inlet and outlet from said pressure vessel, (4) said filter cartridge being positionable in said head member and rotatable to a secured position wherein the bayonet locking lugs coact with said plate-like bracket member and said head member to secure the filter cartridge in place against the fluid pressure of the system in which the filter assembly is disposed.

2. The filter assembly of claim 1 including

O-ring seal means disposed on the cylindrical wall of said closure member in such manner as to separate the inlet port with its associated inlet passage from the outlet port with its associated outlet passage when the closure member is inserted into said head member.

3. The filter assembly of claim 1 wherein said head member includes circumferentially spaced stop means for coacting with said bayonet lugs to limit the rotation of said filter cartridge in said head member and thereby properly align at least one of said fluid passages in said closure member with a corresponding port in said head member.

4. The filter assembly of claim 1 wherein said filter means includes a filter septum disposed in said pressure vessel, said filter septum being connected with the outlet passage in said closure member, and further including a filter media disposed in said pressure vessel and surrounding said filter septum.

5. The filter assembly of claim 4 wherein said filter media is a granular activated carbon.

6. The filter assembly of claim 4 wherein said filter media is a finely powdered material.

7. The filter assembly of claim 4 wherein said filter media is a mixture of more than one type of powdered materials, at least one of them being powdered activated carbon.

8. The filter assembly of claim 1 wherein said filter means includes a cylindrical filter cartridge disposed in said pressure vessel, said cartridge being connected to the outlet passage in said closure member.

9. The filter assembly of claim 1 wherein at least one of said axially extending inlet and outlet passages formed in the cylindrical portion of said closure member is offset from the centerline of said cylindrical portion.

10. The filter assembly of claim 1 wherein said bayonet locking lugs are of different sizes and said bayonet openings are of correspondingly different sizes for effecting proper alignment of passage means in said closure member with port means in said head member.

11. A filter assembly comprising:

(a) a plate-like bracket member adapted to be supported on a supporting wall structure, (b) a head member attached to said bracket member for receiving a filter cartridge therein, said head member comprising an inverted cup-like structure having inlet and outlet ports in the wall thereof and adapted to have a filter cartridge secured therein, (c) a filter cartridge including (1) a pressure vessel closed at one end, (2) a closure member sealingly disposed in the open end of said pressure vessel, said closure member including, (a) an annular base portion which is fitted onto and secured onto the open end of said pressure vessel, (b) an elongated cylindrical portion formed integrally with said base portion and adpated to be inserted into said head member in sealing engagement therewith, (c) a pair of axially extending inlet and outlet passages formed in said elongated cylindrical portion, (1) one of said passages being formed with a first communicating port in the wall of said cylindrical portion, (2) the other of said passages being formed with a second communicating port in the wall of said cylindrical portion, (3) said first and second communicating ports being in fluid communication with the inlet and outlet ports of said head member, (d) a pair of radially extending bayonet locking lugs oppositely disposed on the outer surface of said closure member, (3) filter means disposed within said pressure vessel between the inlet to and outlet from said pressure vessel, (4) means associated with said head member for coacting with said radially extending bayonet locking lugs for securing said filter cartridge in place in said head member against the fluid pressure of the system in which the filter assembly is disposed.

12. The filter assembly of claim 11 including a pair of O-ring seals disposed on the cylindrical wall of said closure member in such manner as to separate the inlet port with its associated inlet passage from the outlet port with its associated outlet passage and further to seal the internal pressure from the surrounding atmosphere when the closure member is inserted into said head member.

13. The filter assembly of claim 11 wherein said head member includes circumferentially spaced stop means for coacting with said bayonet lugs to limit the rotation of said filter cartridge in said head member.

14. In a filter assembly the combination comprising:

(a) a head member adapted to be disposed in a fluid conduit and adapted to have a filter cartridge inserted thereinto, said head member comprising a cup-like structure having an annular bore formed therein and inlet and outlet ports formed in the wall portion and communicating with said bore, and circumferentially spaced stop means associated with said head member, (b) a filter cartridge including (1) a pressure vessel closed at one end, (2) a closure member sealingly disposed in the open end of said pressure vessel, said closure member including, (a) an annular base portion which is fitted onto and secured onto the open end of said pressure vessel, (b) an elongated cylindrical portion formed integrally with said base portion and adapted to be inserted into said head member in sealing engagement therewith, (c) a pair of substantially axially extending inlet and outlet passages formed in said elongated cylindrical portion (1) one of said passages being formed with a first communicating port in the wall of said cylindrical portion, (2) the other of said passages being formed with a second communicating port in the wall of said cylindrical portion, (3) said first and second communicating ports being in fluid communication with the inlet and outlet ports of said head member, (d) cooperating means on said head member and said closure member for aligning at least one of said ports in said head member and a corresponding port in said closure member, and wherein said cooperating means includes bayonnet locking lug means formed on said closure member which coacts with said stop means.

15. The combination of claim 14 wherein said cooperating means include a pair of radially extending oppositely disposed bayonet locking lugs formed on said closure member which coact with said stop means.

16. The combination of claim 14 wherein at least one of said communicating ports in said elongated cylindrical portion of said closure member is formed in the side wall of said closure member.

17. The combination of claim 14 wherein one of said communicating ports in said elongated cylindrical portion of said closure member is formed in the end wall of said closure member.

18. The combination of claim 14 including a pair of O-ring seals disposed on the cylindrical wall of said closure member in such manner as to separate the inlet port with its associated inlet passage from the outlet port with its associated outlet passage and further to seal the internal pressure from the surrounding atmosphere when the closure member is inserted into said head member.

19. The combination of claim 14 wherein said head member includes an abutment with which said bayonet lugs coact to allow the closure member of the filter cartridge to extend into said head member a predetermined distance which is less than the full depth of the cavity of the head member so as to create a fluid well which establishes a fluid conduit between a port in the wall of said head member and one of said communicating ports in said closure member.

20. A filter assembly comprising:

(a) a plate-like bracket member adapted to be supported on a supporting wall structure, said bracket member including annular opening means for receiving a closure member of a filter cartridge therethrough, said opening means including a pair of oppositely disposed bayonet openings, (b) a head member attached to said bracket member for receiving a filter cartridge therein, said head member comprising an inverted cup-like structure having inlet and outlet ports formed therein and adapted to have a filter cartridge secured therein, (c) a filter cartridge including (1) a pressure vessel closed at one end, (2) a closure member sealingly disposed in the open end of said pressure vessel, said closure member including, (a) an annular base portion which is fitted into and secured into the open end of said pressure vessel, (b) an elongated cylindrical portion formed integrally with said base portion and adapted to be inserted into said head member in sealing engagement therewith, (c) a pair of axially extending inlet and outlet passages formed in said elongated cylindrical portion amd adapted for fluid communication with the inlet and outlet ports of said head member, (d) a pair of radially extending bayonet locking lugs formed on the outer surface of said closure member and adapted to be aligned with said bayonet openings in said bracket member when the filter cartridge is inserted into or removed from the head member, (3) filter means disposed within said pressure vessel between the inlet and outlet from said pressure vessel, (4) said filter cartridge being positionable in said head member and rotatable to a secured position wherein the bayonet locking lugs coact with said plate-like bracket member and said head member to secure the filter cartridge in place against the fluid pressure of the system in which the filter assembly is disposed.

21. The filter assembly of claim 20 including O-ring seal means disposed on said closure member in such manner as to separate the inlet passage from the outlet passage when the closure member is inserted into said head member.

22. The filter assembly of claim 20 wherein said head member includes circumferentially spaced stop means for coacting with said bayonet lugs to limit the rotation of said filter cartridge in said head member and thereby properly align at least one of said fluid passages in said closure member with a corresponding port in said head member.

23. The filter assembly of claim 20 wherein said filter means includes a filter septum disposed in said pressure vessel, said filter septum being connected with the outlet passage in said closure member, and further including a filter media disposed in said pressure vessel and surrounding said filter septum.

24. The filter assembly of claim 23 wherein said filter media is a granular activated carbon.

25. The filter assembly of claim 23 wherein said filter media is a finely powdered material.

26. The filter assembly of claim 23 wherein said filter media is a mixture of more than one type of powdered materials, at least one of them being powdered activated carbon.

27. The filter assembly of claim 20 wherein said filter means includes a cylindrical filter cartridge disposed in said pressure vessel, said cartridge being connected to the outlet passage in said closure member.

28. A filter assembly comprising:

a bracket member for supporting a head member, said bracket member being formed with an annular opening for receiving therethrough one end of a filter cartridge and including a pair of circumferentially spaced bayonet openings connected to said annular opening, a head member formed with an inlet and outlet and attached to said bracket member for receiving a filter cartridge therein, a filter cartridge including a pressure vessel, a closure member secured in the open end of said pressure vessel and containing or adapted to contain a filter and further including an inlet and outlet for communicating with the inlet and outlet of said head, and a pair of radially extending bayonet lugs formed on the outer surface of said closure member which extends through said annular opening means, said bayonet lugs, when the filter cartridge is assembled in the head member in an operable position, coacting with said bracket member to support the filter cartridge in such operable position in said head member.

29. The filter assembly of claim 28 wherein said bayonet lugs and the corresponding openings are of different sizes so that the filter cartridge can be inserted into the head member in a predetermined position.

30. The filter assembly of claim 28 wherein counterbore means are formed in the head member, and stop means are formed in said counterbore means for coacting with said bayonet lugs to provide proper alignment of the inlet and outlet ports in the filter cartridge and head member.

*31. A filter assembly comprising*

*(a) a plate-like bracket member adapted to be supported on a supporting wall structure, said bracket member, including annular opening means for receiving a closure member of a filter cartridge therethrough, said opening means including a pair of oppositely disposed bayonet openings,*

*(b) a head member attached to said bracket member for receiving a filter cartridge therein, said head member having inlet and outlet ports formed therein,*

*(c) a filter cartridge including*

*(1) a pressure vessel closed at one end,*

*(2) a closure member sealingly disposed in the open end of said pressure vessel, said closure member including,*

*(a) an annular base portion which is fitted into and secured into the open end of said pressure vessel,*

*(b) a centrally disposed projecting portion formed integrally with said base portion and adapted to be inserted into said head member in sealing engagement therewith,*

*(c) a pair of axially extending inlet and outlet passages formed in said projecting portion and adapted for fluid communication with the inlet and outlet ports of said head member,*

*(d) a pair of radially extending bayonet locking lugs formed on the outer surface of said closure member and adapted to be aligned with said bayonet openings in said bracket member when the filter cartridge is inserted into or removed from the head member,*

*(3) filter means disposed within said pressure vessel between the inlet and outlet from said pressure vessel,*

*(4) said filter cartridge being positionable in said head member and rotatable to a secured position wherein the bayonet locking lugs coact with said plate-like bracket member and said head member to secure the filter cartridge in place against the fluid pressure of the system in which the filter assembly is disposed.*

*32. The filter assembly of claim 31 including a shut-off valve associated with the inlet port in said head.*

*33. The filter assembly of claim 31 including O-ring seal means disposed on said closure member in such manner as to separate the inlet passage from the outlet passage when the closure member is inserted into said head member.*

*34. The filter assembly of claim 31 wherein said filter means includes a filter septum disposed in said pressure vessel, said filter septum being connected with the outlet passage in said closure member, and further*

*including a filter media disposed in said pressure vessel and surrounding said filter septum.*

*35. The filter assembly of claim 34 wherein said filter media is a granular activated carbon.*

*36. The filter assembly of claim 34 wherein said filter media is a finely powdered material.*

*37. The filter assembly of claim 34 wherein said filter media is a mixture of more than one type of powdered materials, at least one of them being powdered activated carbon.*

*38. The filter assembly of claim 31 wherein said filter means includes a cylindrical filter cartridge disposed in said pressure vessel, said cartridge being connected to the outlet passage in said closure member.*

*39. A filter assembly comprising:*

*(a) a pressure vessel closed at one end and having filtering means disposed therein,*

*(b) a closure member sealingly disposed in the open end of said pressure vessel, said closure member including,*

*(1) an elongated cylindrical portion adapted to be inserted into a head member in sealing engagement therewith,*

*(2) inlet and outlet passages formed in closure member, said inlet and outlet passages being eccentrically disposed with respect to the axis of said closure member,*

*(c) first and second axially spaced O-ring seals disposed on the cylindrical wall of said closure member,*

*(d) a pair of radially extending bayonet locking lugs formed on the outer surface of said closure member for securing the filter cartridge in a filter assembly of which the filter cartridge is adapted to be a part,*

*(e) a head member for receiving the filter cartridge therein and having inlet and outlet ports which are adapted for fluid communication with corresponding ports formed in said closure member, and*

*(f) cooperative means on said locking lugs and said head member for limiting the rotation of the cartridge with respect to said head member to properly align at least one of the fluid passages in said closure member with a corresponding port in said head member.*

*40. The filter assembly of claim 39 further including* a plate-*like member adapted to be attached to a supporting structure, said plate-like member including annular opening means for receiving said closure member therethrough, said opening means being formed with a pair of oppositely disposed bayonet openings connected thereto for accommodating the passage therethrough of bayonet lugs formed on said closure member, and said filter cartridge being positionable in said head member and rotatable to a secured position wherein the bayonet locking lugs coact with said plate-like member and said head member to secure the filter cartridge in place against the fluid pressure of the system in which the filter assembly is disposed.*

*41. A filter cartridge comprising:*

*(a) a pressure vessel closed at one end,*

*(b) a closure member sealingly disposed in the open end of said pressure vessel, said closure member including*

*(1) an annular base portion which is secured in the open end of said pressure vessel,*

*(2) an elongated cylindrical portion formed integrally with said base portion and adapted to be inserted into a head member in sealing engagement therewith;*

*(3) a pair of substantially axially extending inlet and outlet passages formed in said elongated cylindrical portion, said pair of substantially axially extending inlet and outlet passages being eccentrically disposed with respect to the axis of said closure member,*

*(i) one of said passages being formed with a first communicating port in the wall of said cylindrical portion,*

*(ii) the other of said passages being formed with a second communicating port in the wall of said cylindrical portion,*

*(iii) said first and second communicating ports being adapted for fluid communication with the inlet and outlet ports of a head member with which said filter cartridge is adapted to be associated,*

*(c) first and second axially spaced O-ring seals disposed on the outer periphery of the cylindrical wall of said closure member,*

*(1) said first of said O-ring seals being axially spaced from and disposed between said first and second communicating ports, and*

*(2) said second of said O-ring seals being axially spaced from and disposed between one of said communicating ports and the atmosphere for sealing the internal pressure from the surrounding atmosphere when the closure member is inserted into a head member with which the member is adapted to be associated,*

*(d) a pair of radially extending bayonet lugs formed on the outer surface of said closure member for securing the filter cartridge in a filter assembly of which the filter cartridge is adapted to be a part, and*

*(e) filter means disposed within said pressure vessel between the inlet and outlet from said pressure vessel, said filter means including*

*(1) a filter septum disposed in the pressure vessel, said filter septum being connected with the outlet passage in said closure member, and*

*(2) filter media disposed in said pressure vessel and surrounding said filter septum, the filter media being a granulated activated carbon.*

*42. A filter cartridge comprising:*

*(a) a pressure vessel closed at one end,*

*(b) a closure member sealingly disposed in the open end of said pressure vessel, said closure member including*

*(1) an annular base portion which is secured in the open end of said pressure vessel;*

*(2) an elongated cylindrical portion formed integrally with said base portion and adapted to be inserted into a head member in sealing engagement therewith;*

*(3) a pair of substantially axially extending inlet and outlet passages formed in said elongated cylindrical portion, said pair of substantially axially extending inlet and outlet passages being eccentrically disposed with respect to the axis of said closure member,*

*(i) one of said passages being formed with a first communicating port in the wall of said cylindrical portion,*

*(ii) the other of said passages being formed with a second communicating port in the wall of said cylindrical portion,*

*(iii) said first and second communicating ports being adapted for fluid communication with the inlet and outlet ports of a head member with which said filter cartridge is adapted to be associated,*

(c) *first and second axially spaced O-ring seals disposed on the outer periphery of the cylindrical wall of said closure member,*

(1) *said first of said O-ring seals being axially spaced from and disposed between said first and second communicating ports, and*

(2) *said second of said O-ring seals being axially spaced from and disposed between one of said communicating ports and the atmosphere for sealing the internal pressure from the surrounding atmosphere when the closure member is inserted into a head member with which the member is adapted to be associated,*

(d) *a pair of radially extending bayonet lugs formed on the outer surface of said closure member for securing the filter cartridge in a filter assembly of which the filter cartridge is adapted to be a part, and*

(e) *filter means disposed within said pressure vessel between the inlet and outlet from said pressure vessel, said filter means including*

(1) *a filter septum disposed in the pressure vessel, said filter septum being connected with the outlet passage in said closure member, and*

(2) *filter media disposed in said pressure vessel and surrounding said filter septum, said filter media being a finely powdered material.*

*43. A filter cartridge comprising:*

(a) *a pressure vessel closed at one end,*

(b) *a closure member sealingly disposed in the open end of said pressure vessel, said closure member including*

(1) *an annular base portion which is secured in the open end of said pressure vessel;*

(2) *an elongated cylindrical portion formed integrally with said base portion and adapted to be inserted into a head member in sealing engagement therewith;*

(3) *a pair of substantially axially extending inlet and outlet passages formed in said elongated cylindrical portion, said pair of substantially axially extending inlet and outlet passages being eccentrically disposed with respect to the axis of said closure member,*

(i) *one of said passages being formed with a first communicating port in the wall of said cylindrical portion,*

(ii) *the other of said passages being formed with a second communicating port in the wall of said cylindrical portion,*

(iii) *said first and second communicating ports being adapted for fluid communication with the inlet and outlet ports of a head member with which said filter cartridge is adapted to be associated,*

(c) *first and second axially spaced O-ring seals disposed on the outer periphery of the cylindrical wall of said closure member,*

(1) *said first of said O-ring seals being axially spaced from and disposed between said first and second communicating ports, and*

(2) *said second of said O-ring seals being axially spaced from and disposed between one of said communicating ports and the atmosphere for sealing the internal pressure from the surrounding atmosphere when the closure member is inserted into a head member with which the member is adapted to be associated,*

(d) *a pair of radially exending bayonet lugs formed on the outer surface of said closure member for securing the filter cartridge in a filter assembly of which the filter cartridge is adapted to be a part, and*

(e) *filter means disposed within said pressure vessel between the inlet and outlet from said pressure vessel, said filter means including*

(1) *a filter septum disposed in the pressure vessel, said filter septum being connected with the outlet passage in said closure member, and*

(2) *filter media disposed in said pressure vessel and surrounding said filter septum, said filter media being a mixture of more than one type of powdered materials, at least one of them being powdered activated carbon.*

* * * * *